(12) United States Patent
Burgan et al.

(10) Patent No.: US 7,787,870 B2
(45) Date of Patent: Aug. 31, 2010

(54) METHOD AND SYSTEM FOR ASSOCIATING A USER PROFILE TO A CALLER IDENTIFIER

(75) Inventors: John M. Burgan, North Palm Beach, FL (US); Mohammad Besharat, Lake Villa, IL (US)

(73) Assignee: Motorola, Inc., Schaumburg, IL (US)

( * ) Notice: Subject to any disclaimer, the term of this patent is extended or adjusted under 35 U.S.C. 154(b) by 238 days.

(21) Appl. No.: 11/537,251

(22) Filed: Sep. 29, 2006

(65) Prior Publication Data

US 2008/0080688 A1    Apr. 3, 2008

(51) Int. Cl.
*H04M 3/42* (2006.01)
(52) U.S. Cl. .................... 455/415; 455/425; 455/435.1; 455/410; 455/411; 455/432.3
(58) Field of Classification Search .................. 455/415, 455/425, 435.1, 410, 411, 412.1, 432.3
See application file for complete search history.

(56) References Cited

U.S. PATENT DOCUMENTS

| | | | |
|---|---|---|---|
| 6,683,564 B1 | 1/2004 | McBurney | |
| 2002/0055351 A1 | 5/2002 | Elsey et al. | |
| 2002/0191639 A1 | 12/2002 | Norby | |
| 2004/0209607 A1* | 10/2004 | Stepanich et al. | 455/418 |
| 2005/0047337 A1* | 3/2005 | Virtanen | 370/229 |
| 2005/0117725 A1 | 6/2005 | Baker | |
| 2007/0014314 A1* | 1/2007 | O'Neil | 370/503 |
| 2007/0047519 A1* | 3/2007 | Bangor et al. | 370/352 |
| 2007/0143824 A1* | 6/2007 | Shahbazi | 726/1 |
| 2007/0223668 A1 | 9/2007 | Blumenfeld et al. | |

(Continued)

FOREIGN PATENT DOCUMENTS

GB    2408179 A    5/2005

(Continued)

OTHER PUBLICATIONS

Keith Pleas, "Microsoft® Windows® XP: User Accounts and Fast User Switching", Windows XP Developer Center, 5 pages. http://windowsxp.devx.com/articles/fus/default.asp, website last visited Sep. 29, 2006.

(Continued)

*Primary Examiner*—Joseph H Feild
*Assistant Examiner*—Huy D Nguyen
(74) *Attorney, Agent, or Firm*—Pablos Meles; Larry G. Brown; Sylvia Chen

(57) ABSTRACT

A method (10) and system (200) for associating a user profile (39) to Caller ID signal can include a processor (202) that is controlled under an operating system allowing multiple profiles. The processor extract (12) Caller ID information from a Caller ID signal, associate (14) at least a portion of the Caller ID information with at least a predetermined profile stored on the wireless communication device, and enable (16) access to the predetermined profile only when the portion of the Caller ID information is associated with the predetermined profile stored on the wireless communication device. The method can store (18) separate profiles on the wireless communication device for each Caller ID or for each predetermined set of Caller IDs or store separate multiple profiles for each Caller ID or set of Caller IDs and further enable user selection among the multiple profiles.

18 Claims, 4 Drawing Sheets

U.S. PATENT DOCUMENTS

2008/0081609 A1 4/2008 Burgan et al.
2008/0146206 A1 6/2008 Pichardo et al.

FOREIGN PATENT DOCUMENTS

WO 2003063455 A1 7/2003

OTHER PUBLICATIONS

Patent Cooperation Treaty, "International Search Report and Written Opinion", ISA/US, by Officer Blaine R. Copenheaver in PCT Application No. PCT/US07/65493; Document of 8 pages dated May 16, 2008.

Patent Cooperation Treaty, "Notification of Transmittal of the International Search Report and the Written Opinion of the International Searching Authority" for International Patent Application No. PCT/US2007/76967, dated May 29, 2008, pp. 1-7.

Symbian Series 60, "Extended Profiles Pro", pp. 1-2, Version 2.40, http://shop/psiloc.com/en/Application, 65542, Psiloc+Extended+Profiles+Pro.

Symbianware, "SmartProfiles", Aug. 6, 2004, pp. 1-4, Version 1.06, http://www.symbianware.com/product.php?id=sprofiles60&pl=n3650.

European Patent Office, "Communication", Extended European Search Report, Feb. 23, 2010, pp. 1-7, European Pat. Appln. No. 07814502.6, Netherlands.

* cited by examiner

METHOD AND SYSTEM FOR ASSOCIATING A USER PROFILE TO A CALLER IDENTIFIER

FIELD

This invention relates generally to communication systems, and more particularly to a method and system of associating or adapting a profile on a wireless communication device to a Caller Identifier (Caller ID) signal.

BACKGROUND

Smart phones commonly support a user profile that contains all the settings customized to a particular users tastes. These may include applications loaded, alert selections, address or phone directory, and the like. Many of the higher end smart phones (Windows CE phones, Symbian phones, or Palm Phones) can support more than one profile. Different profiles may be created for each user of the device, or for each task or application supported by the device. For example, custom applications can be loaded into the smart phone (construction estimating program for example), and also personal preferences configured to the user's personal tastes (family pictures, alerts, etc).

Many people use their phones for more than one task. There may be more than one job which requires different profiles. They may have one profile for work and another for home. A work profile may contain job contacts, and programs to support work tasks, while a home profile may contain games for the kids and an address book full of personal friends. When a user switches tasks from job to home, they will select a different profile. The profile swap can be automatic based on time of day or day of the week (e.g., workday vs. weekend). For many people, work and home life are not that separate or they tend to meld. Such users may switch from work to home tasks and back with each phone call. Their phone may also contain profiles for other family members such as a spouse or child. Thus, it is inconvenient to operate phone menus during a call or between each call to manually select an alternate profile. Some devices can be programmed to switch tasks or modes automatically based on time of day or day of the week and will even select a photo to display or an alert to play based on a Caller ID. Nonetheless, no existing device is known that can switch profiles or modes of operation based on a received Caller ID.

SUMMARY

Embodiments in accordance with the present invention can enable storage of multiple user profiles in a smart phone or other wireless device, and the locking or assignment of such profiles (among multiple profiles) for the user based on a received Caller ID signal. In other words, embodiments herein can automatically select or enable a user to select a profile based on the Caller ID of an incoming call.

In a first embodiment of the present invention, a method of adapting a phone profile in a wireless communication device to a Caller ID signal can include the step of extracting Caller ID information from a received Caller ID signal, associating at least a portion of the Caller ID information with at least a predetermined profile stored on the wireless communication device, and enabling access to the predetermined profile only when the portion of the Caller ID information is associated with the predetermined profile stored on the wireless communication device. The method can further include storing separate profiles on the wireless communication device for each Caller ID or for each predetermined set of Caller IDs. The method can also include storing separate multiple profiles on the wireless communication device for each Caller ID or for each predetermined set of Caller IDs and enabling the user to select a profile among the separate multiple profiles upon receipt of an incoming call having a known Caller ID. The method can further include activating a first profile for a Caller ID that is associated with a first member group and a activating a second profile for a Caller ID that is associated with a second member group. For example, a first profile for work can be created and stored and then retrieved when a call having a Caller ID from a co-worker is received whereas a second profile for home can be created and stored and retrieved when a call having a Caller ID from a personal friend is received. In this regard, different Caller IDs can be associated with different predetermined groups and the different predetermined groups can be associated with different respective profiles stored in the wireless communication device. The step of associating can include associating Caller ID information with settings and applications for a particular user corresponding to the predetermined profile. For example, the Caller ID information can be associated with a user's desktop, bookmarks, applications, or short-cuts a particular user has corresponding to the predetermined profile stored on the wireless communication device. The method can further include the step of denying access to the predetermined profile based on a password or biometric or other security entry that can be associated with the Caller ID. The method can also prompt the selection of any one of the existing profiles, or the creation of a new profile with a default profile upon receiving a previously unseen Caller ID signal. Note, the method can also enable access to public files notwithstanding a coupling of a particular Caller ID signal.

In a second embodiment of the present invention, a system of adapting a phone profile in a wireless communication device to a Caller ID signal can include a transceiver and a processor coupled to the transceiver. The processor can be programmed to extract Caller ID information from a received Caller ID signal, associate at least a portion of the Caller ID information with at least a predetermined profile stored on the wireless communication device, and enable access to the predetermined profile only when the portion of the Caller ID information is associated with the predetermined profile stored on the wireless communication device. The processor can be further programmed to associate Caller ID information with settings and applications for a particular user corresponding to the predetermined profile. The processor can also be programmed to associate at least a portion of the Caller ID information by associating subscriber identity information with a user's desktop, bookmarks, applications, or short-cuts a particular user has corresponding to the predetermined profile stored on the wireless communication device. The processor can be further programmed to deny access to the predetermined profile when a password or hardware or biometric security device is used to lock that profile. The processor can be further programmed to enable the creation of a new profile by prompting a user to select an existing or a default profile upon receiving a previously unseen Caller ID signal.

In a third embodiment of the present invention, a wireless communication device having a system of adapting a phone profile to a Caller ID signal can include a transceiver and a processor coupled to the transceiver that is controlled under an operating system allowing multiple profiles. The processor can be programmed to extract Caller ID information from a received Caller ID signal, associate at least a portion of the Caller ID information with at least a predetermined profile stored on the wireless communication device, and enable access to the predetermined profile only when the portion of the Caller ID information is associated with the predetermined profile stored on the wireless communication device. The processor can be further programmed to store and retrieve separate profiles on the wireless communication device for each Caller ID or for each predetermined set of Caller IDs.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
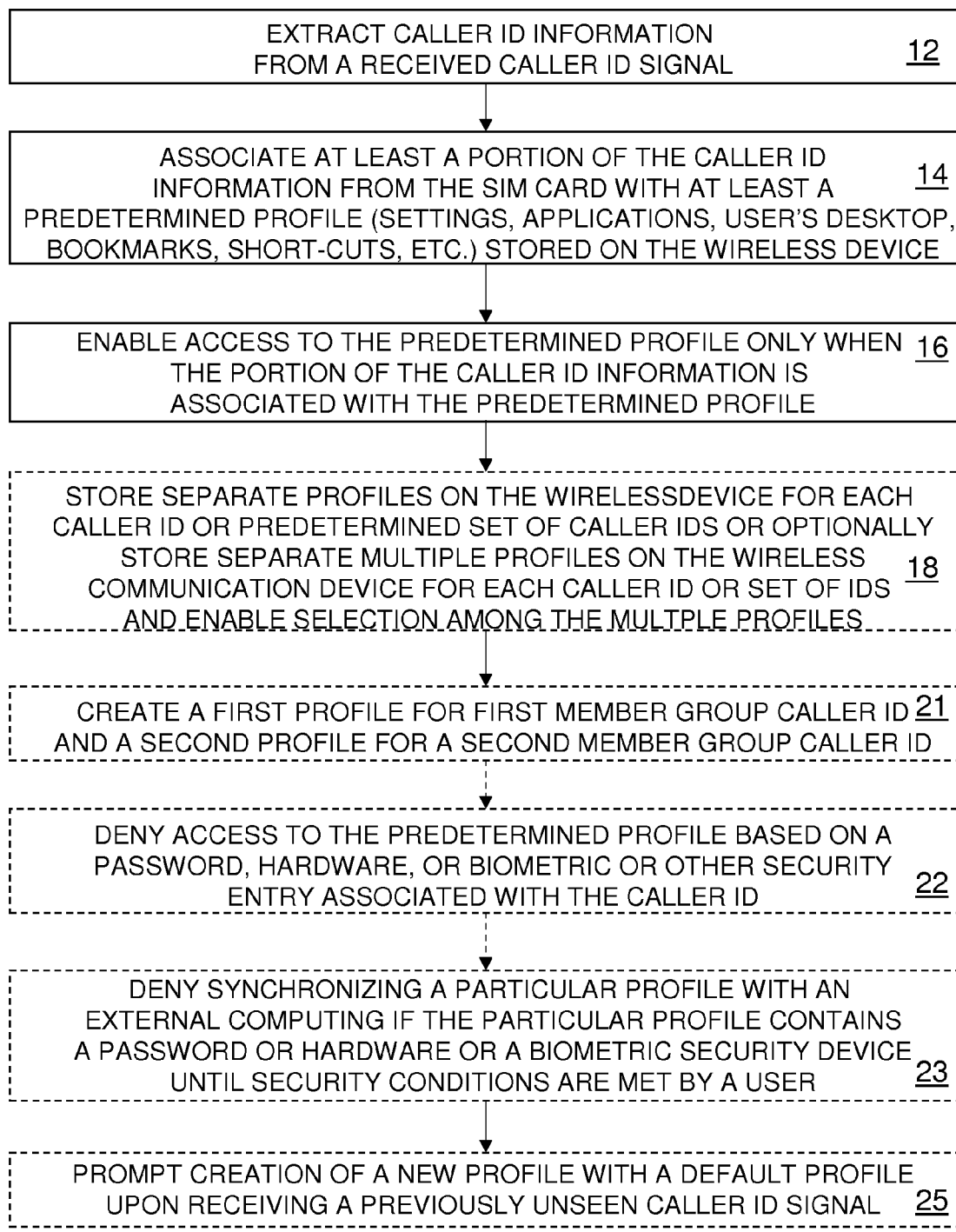
FIG. 1 is a flow chart of a method of associating a user profile with a Caller ID signal in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, a method 10 of adapting a phone profile in a wireless communication device to a Caller ID signal can include the step 12 of extracting Caller ID information from a received Caller ID signal, associating at least a portion of the Caller ID information with at least a predetermined profile stored on the wireless communication device at step 14, and enabling access to the predetermined profile only when the portion of the Caller ID information is associated with the predetermined profile stored on the wireless communication device at step 16. The method can further include at step 18 storing separate profiles on the wireless communication device for each Caller ID or for each predetermined set of Caller IDs. The method can also include storing separate multiple profiles on the wireless communication device for each Caller ID or for each predetermined set of Caller IDs and enabling the user to select a profile among the separate multiple profiles upon receipt of an incoming call having a known Caller ID. The method 10 can further include activating a first profile for a Caller ID that is associated with a first member group and a activating a second profile for a Caller ID that is associated with a second member group at step 21. For example, a first profile for work can be created and stored and then retrieved when a call having a Caller ID from a co-worker is received whereas a second profile for home can be created and stored and retrieved when a call having a Caller ID from a personal friend is received. In this regard, different Caller IDs can be associated with different predetermined groups and the different predetermined groups can be associated with different respective profiles stored in the wireless communication device. The step of associating can include associating Caller ID information with settings and applications for a particular user corresponding to the predetermined profile. For example, the Caller ID information can be associated with a user's desktop, bookmarks, applications, or short-cuts a particular user has corresponding to the predetermined profile stored on the wireless communication device. The method 10 can optionally deny access to the predetermined profile at step 22 based on a password or biometric or other security entry that can be associated with the Caller ID. The method 10 can optionally deny the ability to synchronize a particular profile with an external computing device if the particular profile contains a password or hardware or biometric security device until security conditions are met by the user at step 23. The method 10 can also prompt the creation of a new profile with a default profile or selection of an existing profile upon receiving a previously unseen Caller ID signal at step 25. Note, the method can also enable access to public files notwithstanding receipt of a particular Caller ID signal.

Figure 2:
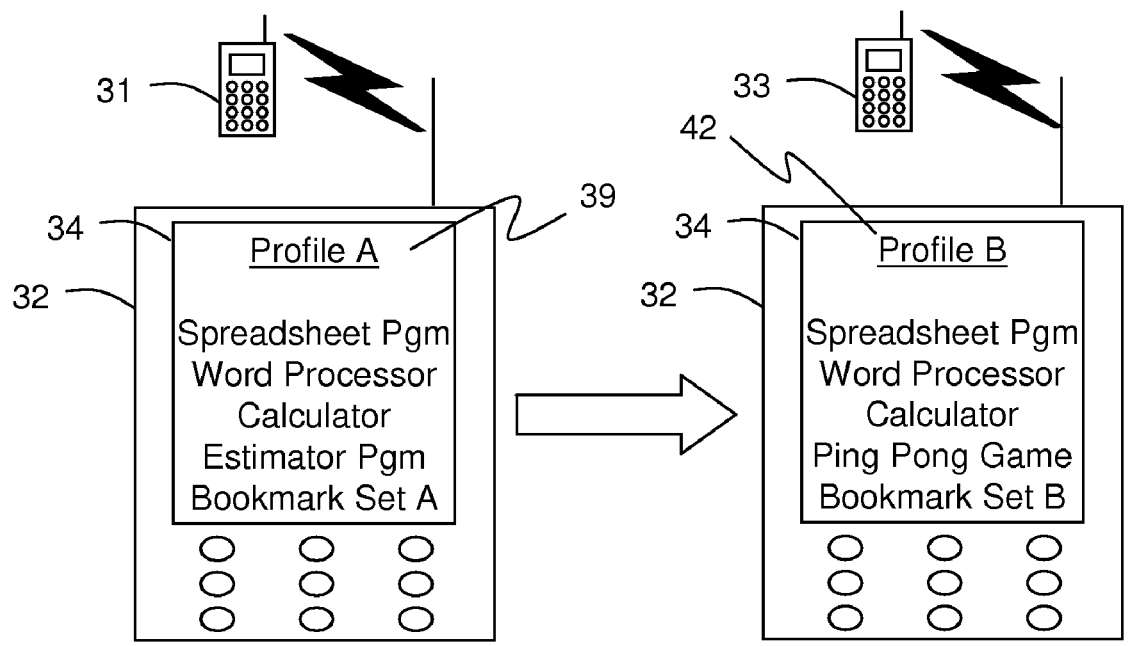
FIG. 2 is a block diagram illustrating how a profile on a wireless communication device is associated with a corresponding Caller ID signal in accordance with an embodiment of the present invention.
Figure 3:
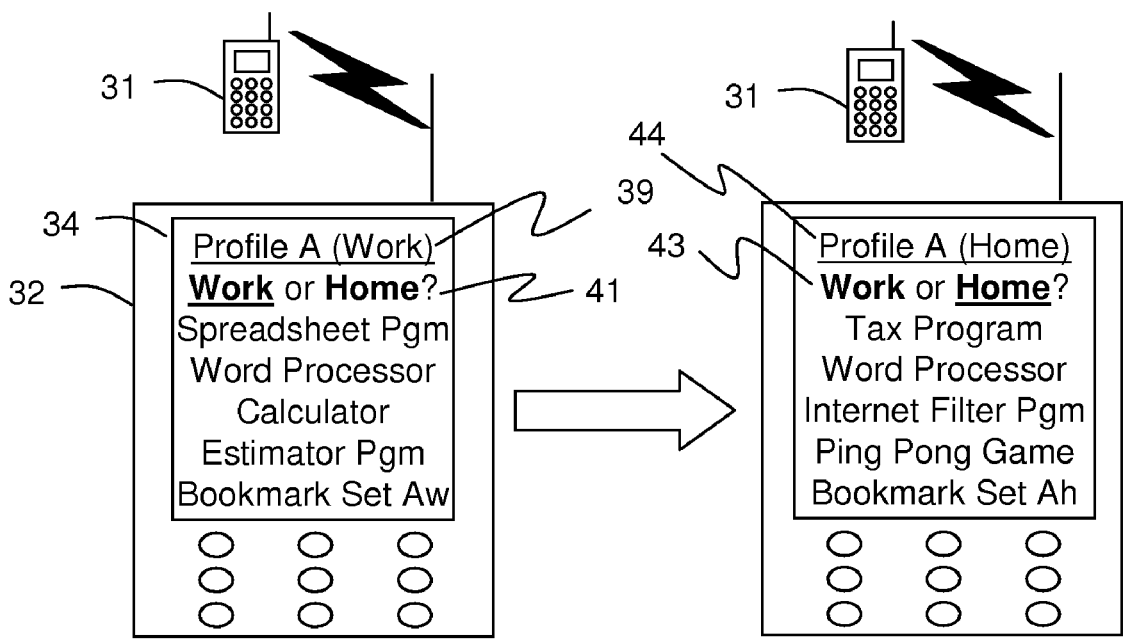
FIG. 3 is a block diagram illustrating how a single Caller ID signal can be associated with multiple profiles on a wireless communication device in accordance with an embodiment of the present invention.

Embodiments herein can be implemented in a wide variety of exemplary ways that can enable a cell phone or smart phone user (or other user of a wireless device capable of having multiple profiles) to share a device securely without having to recreate or reset settings or profiles on the wireless device or phone as shown in FIGS. 2 and 3. In FIG. 2, a wireless communication device 32 having a user interface or display 34 can simply switch among profiles (39 or 42) based on receipt of Caller ID information from a number of different callers. In this instance, a profile 39 or profile A is activated based on a caller ID received from phone 31. The wireless communication device 32 can then switch to another profile B or profile 42 upon receiving another Caller ID for another device 33 that corresponds to the profile 42. As an example, the Caller ID associated with device 31 can be stored in the user's (global) phonebook that further includes pointers to the appropriate profile. Further note, the wireless device 32 is not limited to any particular wireless protocol. The embodiments herein can function with CDMA, GSM, iDEN, or any other type of phone or network enabling the receipt of caller ID information to enable the switching of profiles on the wireless device 32.

A single user may want to configure their device for multiple profiles, for example for home use and for office use as illustrated in the system 50 of FIG. 3. In this way a user's job applications and information will not clutter up their personal desktop and their personal settings won't interfere with his or her job applications. The phone can be programmed to automatically switch to the appropriate profile based on a Caller ID of an incoming call, or further based on a GPS location, or simply based on a user selection. In this example, the user profile 39 can correspond to a work profile as can be selected among selections 41 on the user interface 34 associated with a Caller ID signal from phone 31. Likewise, a user profile 44 can correspond to a home profile corresponding to the same Caller ID signal from phone 31 as can be selected among selections 43 on the user interface 34. Thus, the same Caller ID signal can enable two different profiles for the same user (or different users if desired). Using Caller ID in a similar fashion to set a user profile can allow the user instant access to job applications when a co-worker calls and instant access to their personal phone book and applications when a friend calls. Of course, the number of profiles and associations are not just limited to two or for work and personal. Any number of profiles can be created for any number of different member groups. Further note, there can be common or public areas available to all profiles so that users may store applications available to all profiles regardless of caller ID Also note, the phone can also contain a default profile that would be used when a new previously unseen Caller ID signal is received. In such instances, the user can associate any new Caller ID signal with a newly created group and profile (old or new profile) or associate any new Caller ID signal with an existing group that is already associated with an existing profile. Further note, when a user creates a new phone number entry in an electronic phonebook, the wireless device can prompt the user to associate the new phone number with either a default profile, an existing stored profile, a currently operating profile, or a new profile.

For further illustration of the embodiments herein, a user may have a work and home device profile. The work profile can contain job applications and a contact list of coworkers and customers, and the home profile can have games, shopping lists, and a contact list of friends. When a call comes in, the Caller ID can be compared to the phone list associated with each profile, and when found, the profile will automatically switch to the one appropriate for the incoming caller. In a more specific example, a doctor at the beach with his or her family on the weekend can be operating his or her phone using a "home" profile, and an important call comes in from a patient. This phone can then for example automatically switch to his or her work profile and display his or her patient history files, and business phone directory with numbers of pharmacies, other doctors, and hospitals. If the next incoming call is from a relative, the phone will automatically switch back to the home profile showing a contact list of friends, his or her list of local restaurants and theaters, and other information stored for use when he is not working. This allows the doctor easiest access to the information he or she may need for the current call.

Figure 4:
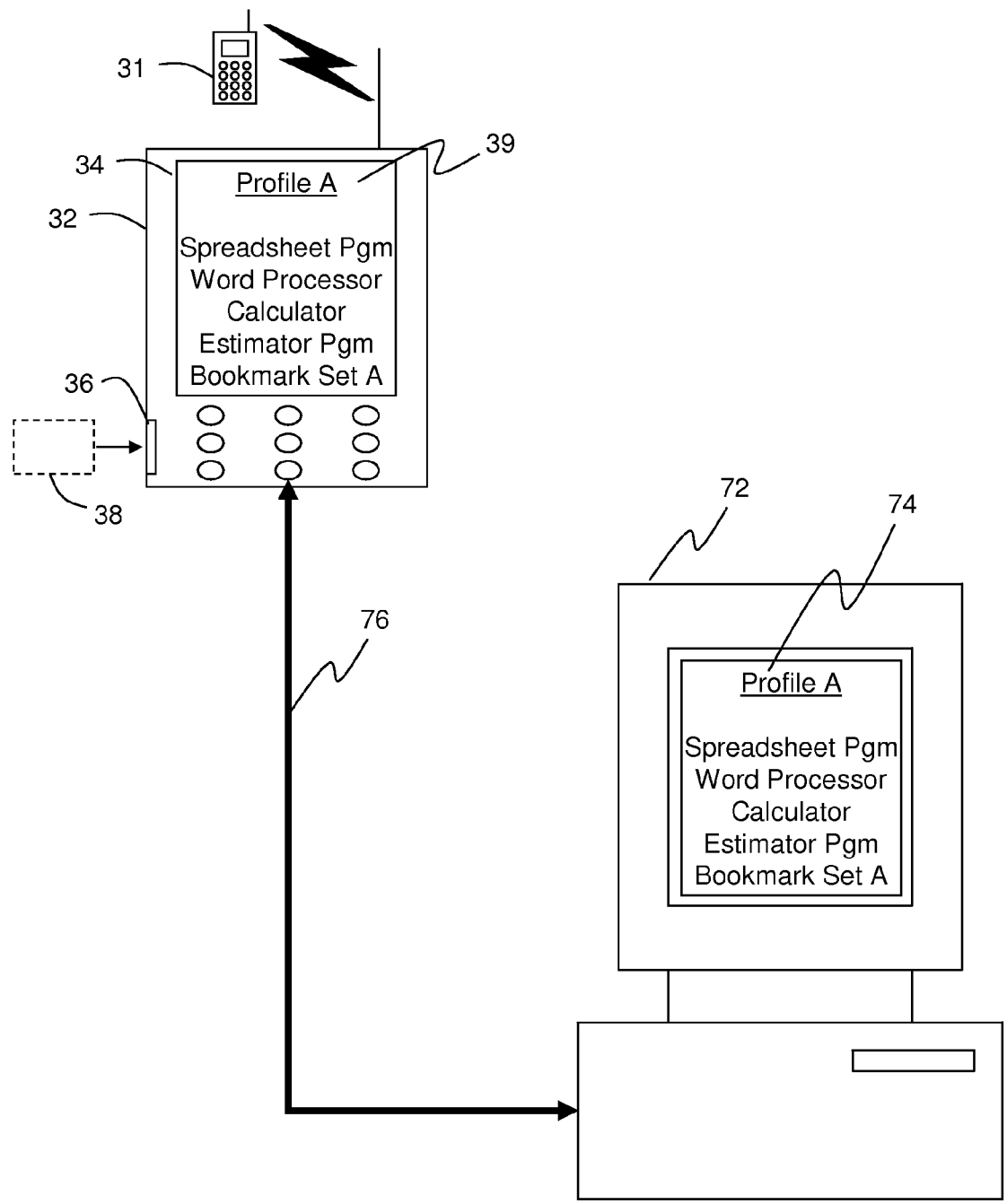
FIG. 4 is a block diagram illustrating the synchronization of a wireless communication device with a computer where the communication device has an associated profile associated with a Caller ID signal in accordance with an embodiment of the present invention.

Referring to FIG. 4, a system 70 including the wireless communication device 32 of FIGS. 2 and 3 is shown coupled to the computing device 72 for synchronization in accordance with an embodiment of the present invention. The techniques previously described with regards to FIGS. 1-3 can be used here as a secure method of identifying the wireless device 32 to the computing device 72 for purposes of synchronization. For example, the wireless communication device 32 can contain data for multiple accounts associated with different profiles. In accordance with the embodiments herein, the system 70 can be configured to deny synchronization of account data corresponding to an optional password or security device with the corresponding account on the computing device 72. In this manner, data and settings in profile 39 or profile A will be synchronized with data and settings in a corresponding profile 74 or profile A in the computing device 72 (via connection 76). Other account information belonging to other people (corresponding to other passwords or security devices such as optional security device 38) would not be transferred to the computing device 72 during such synchronization. The security device 38 can be integrated into the wireless device 32 or arranged as a separate device as shown that mates with a port 36 on the communication device 32. The security device can be a hardware key or a biometric entry device that can read fingerprints or other biometric data.

Each new user on a particular device can get their own new profile. Each user can also have multiple profiles based on the different Caller ID signals received as discussed above. As with other types of systems that support more than one user, the first time a user can log on the user can get a default new user account. Such default new user account can enable a new user to store their files in either public areas for others to view or in secure areas that can only be visible to the new user when the proper password or security device is supplied. New profiles can also be created based on previously unseen Caller ID signals as noted above. Once created, the user can then synchronize their personal account with other devices if desired. Only a "super user" or "administrator" can remove his account from the device.

Figure 5:
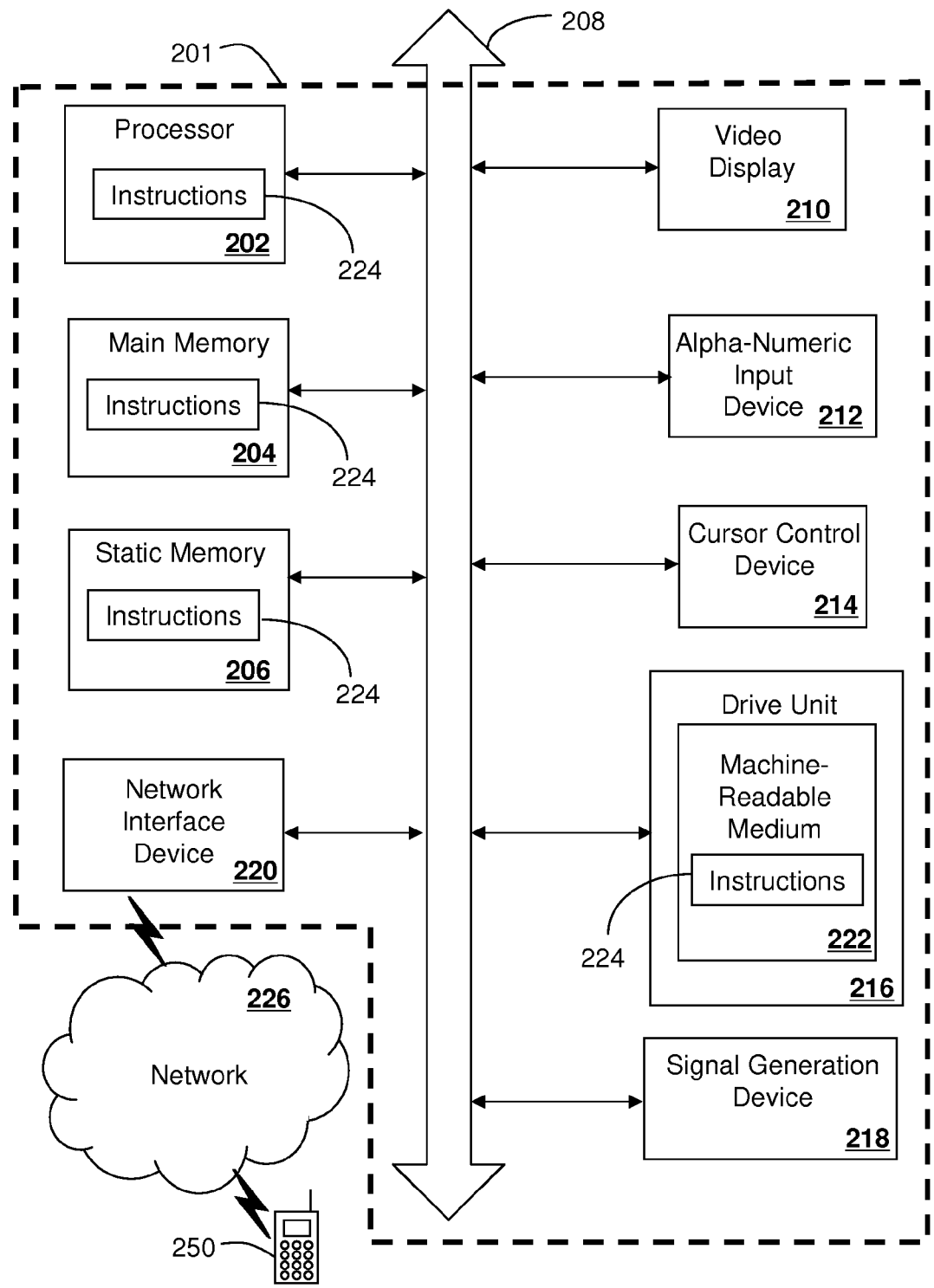
FIG. 5 is an illustration of a system for associating a user profile with a Caller ID in accordance with an embodiment of the present invention.

FIG. 5 depicts an exemplary diagrammatic representation of a machine in the form of a computer system 200 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such as a video display unit 210 (e.g., a liquid crystal display (LCD), a flat panel, a solid state display, or a cathode ray tube (CRT)). The computer system 200 may include an input device 212 (e.g., a keyboard), a cursor control device 214 (e.g., a mouse), a disk drive unit 216, a signal generation device 218 (e.g., a speaker or remote control that can also serve as a presentation device) and a network interface device or transceiver 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor 202 during execution thereof by the computer system 200. The main memory 204 and the processor 202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device or transceiver 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of adapting a phone profile in a wireless communication device to a caller identifier (Caller ID) signal, comprising the steps of:
    extracting Caller ID information from a received Caller ID signal;
    associating at least a portion of the Caller ID information with at least a predetermined profile stored on the wireless communication device;
    enabling access to the predetermined profile only when the portion of the Caller ID information is associated with the predetermined profile stored on the wireless communication device;
    wherein the step of associating comprises associating Caller ID information with settings and applications for a particular user corresponding to the predetermined profile;
    storing on the wireless communication device separate multiple predetermined profiles relating to the user of the wireless communication device, wherein the multiple predetermined profiles include a work-related predetermined profile and a personal predetermined profile of the user; and
    switching between the work-related predetermined profile and the personal predetermined profile based on the Caller ID information from the received Caller ID signal.

2. The method of claim 1, wherein the method further comprises the step of storing separate profiles on the wireless communication device for each Caller ID or for each predetermined set of Caller IDs.

3. The method of claim 2, wherein the method further comprises activating a first profile for a Caller ID that is associated with a first member group and activating a second profile for a Caller ID that is associated with a second member group.

4. The method of claim 1, wherein the step of storing separate multiple profiles on the wireless communication device comprises storing separate profiles for each Caller ID or for each predetermined set of Caller IDs and enabling the user to select a profile among the separate multiple profiles upon receipt of an incoming call having a known Caller ID.

5. The method of claim 1, wherein the step of associating comprises associating Caller ID information with a user's desktop, bookmarks, applications, or short-cuts a particular user has corresponding to the predetermined profile stored on the wireless communication device.

6. The method of claim 1, wherein the method further comprises the step of denying access to the predetermined profile based on a password or hardware or biometric security associated with the profile selected by Caller ID information.

7. The method of claim 6, wherein the method further comprises the step of denying the ability to synchronize a particular profile with an external computing device if the particular profile contains a password or hardware or biometric security device until security conditions are met by the user.

8. The method of claim 1, wherein the method further comprises the step of prompting the creation of a new profile with a default profile upon receiving a previously unseen Caller ID signal.

9. A system of adapting a phone profile in a wireless communication device to a Caller Identifier (Caller ID) signal, comprises:
a transceiver; and
a processor coupled to the transceiver, wherein the processor is operable to:
extract Caller ID information from a received Caller ID signal;
associate at least a portion of the Caller ID information with at least a predetermined profile stored on the wireless communication device; and
enable access to the predetermined profile only when the portion of the Caller ID information is associated with the predetermined profile stored on the wireless communication device;
wherein the system associates at least a portion of the Caller ID information by associating Caller ID information with settings and applications for a particular user corresponding to the predetermined profile;
store on the wireless communication device separate multiple predetermined profiles relating to the user of the wireless communication device, wherein the multiple predetermined profiles include a work-related predetermined profile and a personal predetermined profile of the user; and
switch between the work-related predetermined profile and the personal predetermined profile based on the Caller ID information from the received Caller ID signal.

10. The system of claim 9, wherein the processor is further operable to store separate profiles on the wireless communication device for each Caller ID or for each predetermined set of Caller IDs.

11. The system of claim 9, wherein the system associates at least a portion of the Caller ID information by associating subscriber identity information with a user's desktop, bookmarks, applications, or short-cuts a particular user has corresponding to the predetermined profile stored on the wireless communication device.

12. The system of claim 9, wherein the processor can be further operable to deny access to the predetermined profile based on a password or hardware or biometric security device associated with the predetermined profile.

13. The system of claim 12, wherein the processor can be further operable to deny synchronization with an external computing device any information protected by a password or hardware or biometric security device until the security conditions are met by the user.

14. The system of claim 9, wherein the processor can be further operable to enable the creation of a new profile by prompting a user with a default profile upon receiving a previously unseen Caller ID signal.

15. A wireless communication device having a system of adapting a phone profile to a received caller identifier (Caller ID) signal, comprising:
a transceiver; and
a processor coupled to the transceiver and controlled under an operating system allowing multiple predetermined profiles, wherein the multiple predetermined profiles include a work-related predetermined profile and a personal predetermined profile of the user, wherein the processor is operable to:
extract Caller ID information from a received Caller ID signal;
associate at least a portion of the Caller ID information with at least a predetermined profile stored on the wireless communication device;
enable access to the predetermined profile only when the portion of the Caller ID information is associated with the predetermined profile stored on the wireless communication device;
associate Caller ID information with settings and applications for a particular user corresponding to the predetermined profile;
store separate multiple predetermined profiles on the wireless communication device; and
switch from one predetermined profile to another predetermined profile based on the Caller ID information from the received Caller ID signal.

16. The wireless communication device of claim 15, wherein the processor is further operable to store and retrieve separate profiles on the wireless communication device for each Caller ID or for each predetermined set of Caller IDs.

17. The wireless communication device of claim 15, wherein the processor can be further operable to deny access to the predetermined profile based on a password or hardware or biometric security device associated with the predetermined profile.

18. The wireless communication device of claim 15, wherein the processor is further operable to deny synchronization with an external computing device of any information protected by a password or hardware or biometric security device until the security conditions are met by the user.

* * * * *